United States Patent [19]

Astle

[11] Patent Number: 5,703,966
[45] Date of Patent: Dec. 30, 1997

[54] BLOCK SELECTION USING MOTION ESTIMATION ERROR

[75] Inventor: Brian Astle, Plainsboro, N.J.

[73] Assignee: Intel Corporation, Santa Clara, Calif.

[21] Appl. No.: 495,098

[22] Filed: Jun. 27, 1995

[51] Int. Cl.$^6$ ..................................... G06K 9/00
[52] U.S. Cl. ................................. 382/236; 382/238
[58] Field of Search ........................ 382/232, 236, 382/238, 239, 251, 252, 253, 233, 234, 235, 240, 241, 242, 243, 244, 246, 248, 250; 348/620, 452, 699, 416, 415, 407, 408; 358/261.2, 496

[56] References Cited

U.S. PATENT DOCUMENTS

| | | | |
|---|---|---|---|
| 4,849,810 | 7/1989 | Ericsson | 358/133 |
| 4,933,761 | 6/1990 | Murakami et al. | 358/133 |
| 5,016,040 | 5/1991 | Dwyer, III | 355/20 |
| 5,019,901 | 5/1991 | Uomori et al. | 358/105 |
| 5,126,841 | 6/1992 | Tanaka et al. | 358/105 |
| 5,134,480 | 7/1992 | Wang et al. | 358/140 |
| 5,150,209 | 9/1992 | Baker et al. | 358/133 |
| 5,151,784 | 9/1992 | Lavagetto et al. | 358/136 |
| 5,173,773 | 12/1992 | Ueda et al. | 358/136 |
| 5,198,901 | 3/1993 | Lynch | 358/136 |
| 5,251,028 | 10/1993 | Iu | 358/133 |
| 5,291,286 | 3/1994 | Murakami et al. | 348/469 |
| 5,293,230 | 3/1994 | Golin | 348/410 |
| 5,329,318 | 7/1994 | Keith | 348/699 |
| 5,436,666 | 7/1995 | Astle | 348/416 |

*Primary Examiner*—Leo Boudreau
*Assistant Examiner*—Bijan Tadayon
*Attorney, Agent, or Firm*—William H. Murray; N. Stephan Kinsella

[57] ABSTRACT

A computer-implemented method and apparatus for encoding a current block of pixels of a current picture of a sequence of pictures, the sequence of pictures comprising a previous picture having a previous reference block and a subsequent picture having a subsequent reference block. A previous residual error is determined between the current block and the previous reference block, and a subsequent residual error is determined between the current block and the previous reference block. At least one interpolated picture interpolated between the previous and subsequent pictures is defined, the interpolated picture having an interpolated reference block. An interpolated residual error is determined between the current block and the at least one interpolated reference block from the previous and subsequent residual errors.

37 Claims, 5 Drawing Sheets

ENCODING SYSTEM

FIGURE 1. ENCODING SYSTEM

FIGURE 2. DECODING SYSTEM

BLOCK SELECTION USING MOTION ESTIMATION ERROR

BACKGROUND OF THE INVENTION

1. Field of the Invention

The present invention relates to signal processing and, in particular, to computer-implemented processes and apparatuses for macroblock type selection using residual motion estimation error.

2. Description of the Related Art

This invention relates to signal processing which is often used to compress video image signals representative of video pictures into an encoded bitstream. Each picture may be a still image, or may be part of a plurality of successive pictures of video signal data that represent a motion video. As used herein, "picture" and "video picture" may interchangeably refer to signals representative of an image as hereinabove described. In some encoding standards, pictures are referred to as video frames.

The portion of an encoded bitstream representing a compressed picture may be stored in a mass storage device such as a hard disk drive or compact disk read-only-memory (CD-ROM) in its compressed format in order to conserve storage space. When the compressed picture is later retrieved, it may be decompressed and, for example, displayed on a monitor. A higher amount of compression of the blocks constituting an image tends to lower the number of bits needed to represent the image, but also tends to diminish the quality of the image reconstructed by the decoder.

The encoded bitstream may also be transmitted to one or more remote signal processing systems such as video conferencing nodes which decode the encoded signals. These video conferencing nodes may be personal computer (PC)-based systems communicating with each other over a selected transmission medium. Possible transmission media include Integrated Services Digital Network (ISDN) and Public Switched Telephone Network (PSTN) telephone connections. Although ISDN connections provide a higher bandwidth than PSTN connections, ISDN connections are currently less readily available and more expensive than PSTN connections. Because transmission media have finite bandwidths, in order to provide video conferencing of satisfactory quality, each PC system preferably compresses or encodes in real time the video signals corresponding to the local participant and transmits the resulting compressed signals or bitstreams to the PC systems of the remote participants. Thus, the transmission capabilities of transmission media determine the rate at which bits in the bitstream are transmitted over the transmission media from a PC encoding system to a remote participant.

The objective of transmitting video information is to maximize perceived picture quality within constraints of the transmission channel. Most transmission channels have a fixed capacity, leading to a tradeoff between the quality of each picture and the picture rate. Thus, pictures may generally be transmitted at a fast rate but at a lower quality, or vice-versa. A standard transmission rate in the United States is 30 pictures/second in the International Organization for Standardization (ISO) ISO/IEC 11172 Moving Pictures Experts Group-1 standard (MPEG-1), or 30 frames/second in the ISO/IEC 13818 (MPEG-2) standard. The aforementioned MPEG-1 (ISO/IEC 11172) and MPEG-2 (ISO/IEC 13818) standards are incorporated herein in their entirety by reference.

In some usages, each PC system receives and decompresses compressed signals from the PC systems of remote participants to play DECOMPRESSED video signals locally. Encoders may also, in some usages, encode video pictures offline to perform more computation-intensive and more efficient encoding.

Such encoding operations that compress video image signals typically operate on subsets of the image, such as (8×8) blocks of pixels, or on macroblocks comprising a number of such blocks. A macroblock typically comprises a (16×16) array of luminance pixels (also known as "luma pels") and two associated (8×8) blocks of chrominance, or chroma, information. The (16×16) luma array is further divided into four (8×8) blocks, and all six blocks in a macroblock are typically transformed using the forward discrete cosine transform (DCT), quantized, and further encoded.

Typically, the (8×8) blocks of the image to be encoded are transformed by a forward DCT to generate a transformed signal comprising 64 DCT coefficients, which are also arranged in an (8×8) block. One technique for controlling the bit rate of the encoded bitstream is to select varying quantization levels at the encoding stage which are applied to the DCT coefficients to produce coefficient indexes. Varying quantization levels may be produced by using a basic quantization table which is multiplied or scaled by the quantization level (also sometimes referred to as the quantizer step size or quantization scale). A particular quantization level is typically selected within an acceptable range of quantization levels which are expected to produce approximately the desired codesize for the picture or block being encoded.

In quantization, each DCT coefficient is divided by the quantization factor in the corresponding (8×8) block position in order to reduce the number of bits needed to represent the coefficient. As is appreciated by those skilled in the art, use of a coarser quantization table, associated with a coarser (i.e., higher) quantization level, implies using fewer bits to encode an image but at the cost of image quality. Use of finer quantization tables results in encoded bitstreams with more bits but with higher quality images upon decompression or decoding.

Motion estimation is commonly utilized in signal processing techniques in which successive video pictures are compressed. When these pictures are to be transmitted via a communication medium of limited bandwidth, or are to be stored in a storage medium having limited storage capacity, it is often desirable to first compress the pictures to yield an encoded bitstream. Motion estimation techniques exploit the temporal correlation that often exists between consecutive pictures, in which there is a tendency of some objects or image features to move within restricted boundaries from one location to another from picture to picture.

For instance, picture 1 may contain an object, and picture 2 may contain an identical or very similar set of pixels corresponding to the object spatially displaced by a certain number of pixels from the location of the same set of pixels in picture 1. If picture 1 is transmitted by a video processor to a remote pixel processor or video processor (which performs any necessary decompression or other decoding), picture 2 may be transmitted without the pixels corresponding to the object. Instead, information such as motion vectors or pointers is sent along with picture 2 (which may also be compressed using other techniques). These motion vectors may be utilized by the remote receiving video processor when decoding the received picture 2 to reproduce the object from picture 1 at a new location within picture 2. Since motion vectors can be represented with fewer bits than the pixels that constitute the object, fewer bits need to be transmitted (or stored) in order to recreate the object in Picture 2. As will be appreciated by those skilled in the art, difference blocks may also be transmitted along with motion vectors to improve the reconstruction process. Such difference blocks may also be referred to as residual motion error.

Pictures such as picture 1 that are not based on information from previously transmitted and decoded pictures are called intra pictures, or I pictures. Video pictures which are encoded with motion compensation techniques are referred to as predicted pictures, or P pictures, since their content is predicted from the content of previous I or P pictures. Motion compensation-encoded pictures that do not need to be used as the bases for further motion-compensated pictures are called "bidirectional" or B pictures. A B picture is predicted from either or both of two reference pictures, one of which is displayed before the B picture, and one of which is displayed after the B picture. However, the two reference pictures upon which a B picture is based are encoded and transmitted before the B picture so that the decoder has access to the two reference pictures in order to construct the B picture after its encoded bitstream received. As is understood by those skilled in the art, I, P, and B pictures are utilized in coding standards such as MPEG-1, while other standards, such as H.261 (P×64), developed by the International Telegraph Union (ITU), utilize only I and P pictures. A particular block of a picture may be encoded as a I, P, or B block in some usages.

The motion estimation procedure may be performed at the encoder level by comparing given regions or blocks within a current picture to many regions or blocks within the previous picture. The process of comparing a given block of one picture to blocks of another picture to find a sufficiently similar match is often called "block matching," and the process of comparing one picture against another in this manner is often called "picture differencing." Blocks are matched by determining a "difference measurement" between any given pair of blocks. A difference measurement corresponds to the overall degree of difference of the two regions. If the difference measurement is below a predetermined threshold, the blocks are considered to be similar enough that a block match is indicated. If so, the block in the previous picture may be utilized by the video decoder to reproduce the same block in the current picture.

During motion estimation techniques, a picture is compressed by comparing it to a previous picture, often the immediately preceding picture in a motion video clip or sequence, or to a subsequent picture or to a picture interpolated between the previous and subsequent picture. Where similar blocks are found in the previous picture, a motion vector is transmitted instead of the pixels for that block, which allows the block to be reconstructed from the reference block in the previous picture. As will be understood by those skilled in the art, a difference block, or residual motion error, may also be transmitted to reduce the residual errors remaining after motion compensation. When a given block is matched against several potential reference blocks, the match yielding the lowest difference error may be utilized since it will be least likely to require a difference block or residual motion error.

When a bidirectional or B block is encoded, encoders will typically attempt to determine whether to use forward prediction, backward prediction, or interpolated prediction for a particular block. These prediction methods correspond to previous, subsequent, or interpolated macroblocks, respectively. In a non-real-time encoder or off-line encoder, one way to determine which of these three prediction methods works best is to encode the block using all three methods, and then select the prediction method that requires the fewest bits. As will be appreciated by those skilled in the art, various differencing methods may be used to determine the difference measurements described above. The basis of such a difference measurement, which is often utilized for block matching and picture differencing in motion estimation data compression techniques, is often a calculation known as the L1 Norm, which has the following $$L1\ Norm = \sum_{i=0}^{i=n} \sum_{j=0}^{j=m} |a_{ij} - b_{ij}|$$

where:

$a_{ij}$ is a pixel in the ith row and jth column of the first block;

$b_{ij}$ is a pixel in the ith row and jth column of the second block;

n is the number of rows in a block; and m is the number of columns in a block.

It will be appreciated by those skilled in the art that the lower the difference indicated by the L1Norm calculation, the more similar are the two blocks being compared. Use of more similar reference blocks tends to provide a motion compensation-encoded bitstream with lower bits. It will also be appreciated that calculations other than the L1 Norm may be utilized to perform difference measurements between two pictures. For example, the L2 Norm has the following form:

$$L2\ Norm = \sum_{i=0}^{i=n} \sum_{j=0}^{j=m} (a_{ij} - b_{ij})^2$$

The problem of determining which prediction method to use to encode a given block or macroblock may also be described as selecting the macroblock type, i.e. whether the block is a forward-predicted, backward-predicted, or interpolation-predicted macroblock. One problem with this method of determining which prediction method to use to encode a particular bidirectional block is that this is very computationally expensive. These calculations can be especially burdensome for real-time encoders, for which processing bandwidth may be relatively scarce or otherwise heavily utilized by other processing requirements.

There is thus a need for improved methods and apparatuses for macroblock type selection.

SUMMARY

There is provided herein a computer-implemented method and apparatus for encoding a current block of pixels of a current picture of a sequence of pictures, the sequence of pictures comprising a previous picture having a previous reference block and a subsequent picture having a subsequent reference block. According to a preferred embodiment of the invention, a previous residual error is determined between the current block and the previous reference block, and a subsequent residual error is determined between the current block and the previous reference block. At least one interpolated picture interpolated between the previous and subsequent pictures is defined, the interpolated picture having an interpolated reference block. An interpolated residual error is determined between the current block and the at least one interpolated reference block from the previous and subsequent residual errors.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

In the present invention, there is disclosed a method and apparatus for selecting the macroblock type of a macroblock to be encoded. Error measurements are computed for previous and subsequent reference macroblocks. However, instead of determining an interpolated reference macroblock interpolated between the previous and subsequent reference macroblocks and a calculating the error between the current macroblock and the interpolated reference macroblock, the present invention determines the error between the current macroblock and the interpolated reference macroblock solely utilizing the already-computed forward and backward error. An assumption is made that there is little or no correlation between the previous and subsequent macroblocks, which allows the interpolated error to be estimated from error calculations made with respect to the previous and subsequent macroblocks, as described in further detail hereinbelow.

Video Processing System Hardware

Figure 1:
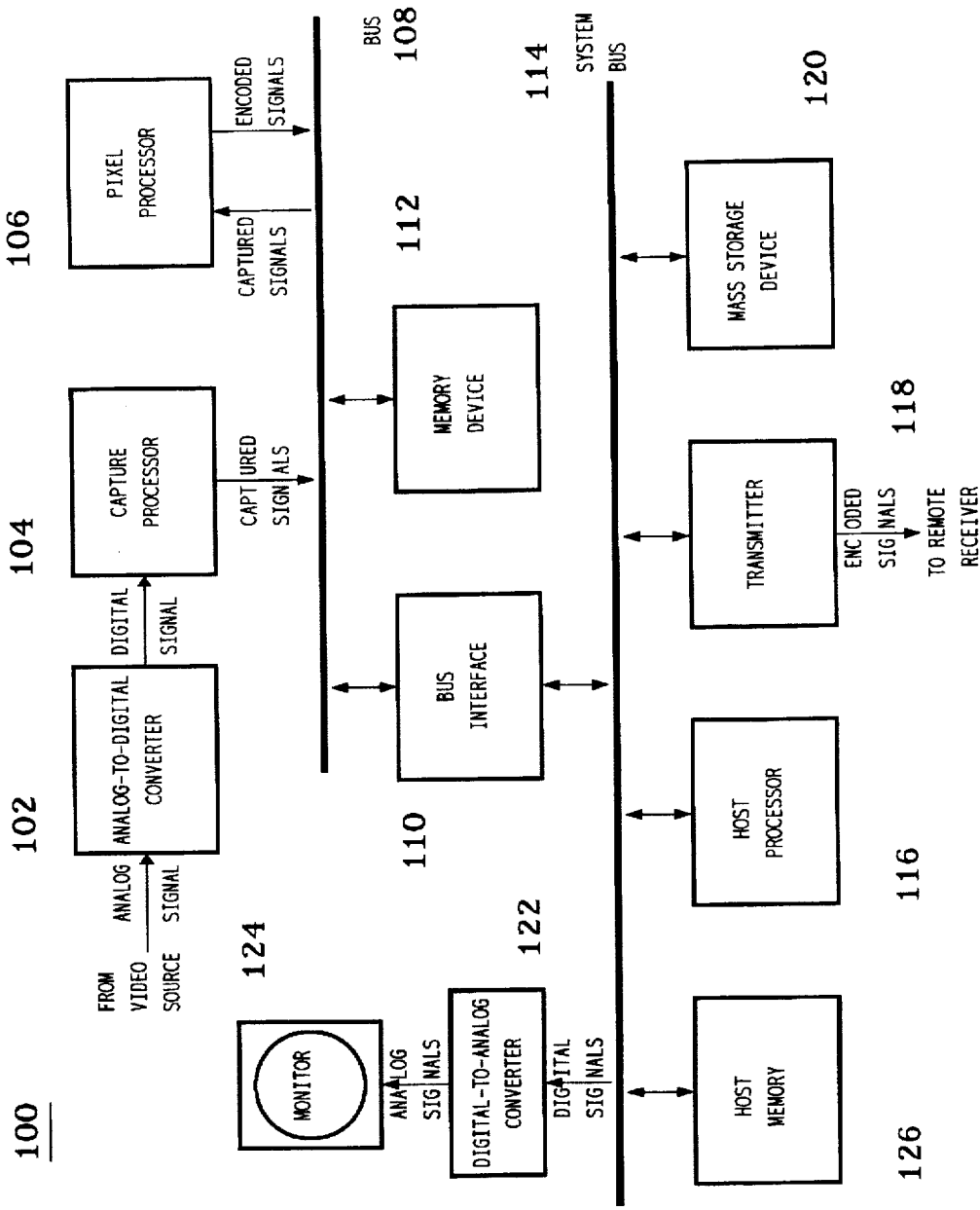
FIG. 1 is a computer-based video processing system for encoding video signals, according to a preferred embodiment of the present invention.

Referring now to FIG. 1, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each picture of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bitmaps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, as described in more detail below, pixel processor 106 applies a sequence of compression techniques to reduce the amount of data used to represent the information in each image. The encoded image may then be stored to memory device 112 via bus 108 for transmission to host processor 116 via bus 108, bus interface 110, and system bus 114 for storage in host memory 126.

Host processor 116 may transmit the encoded image to transmitter 118 for real-time transmission to a remote receiver (not shown in FIG. 1), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Figure 2:
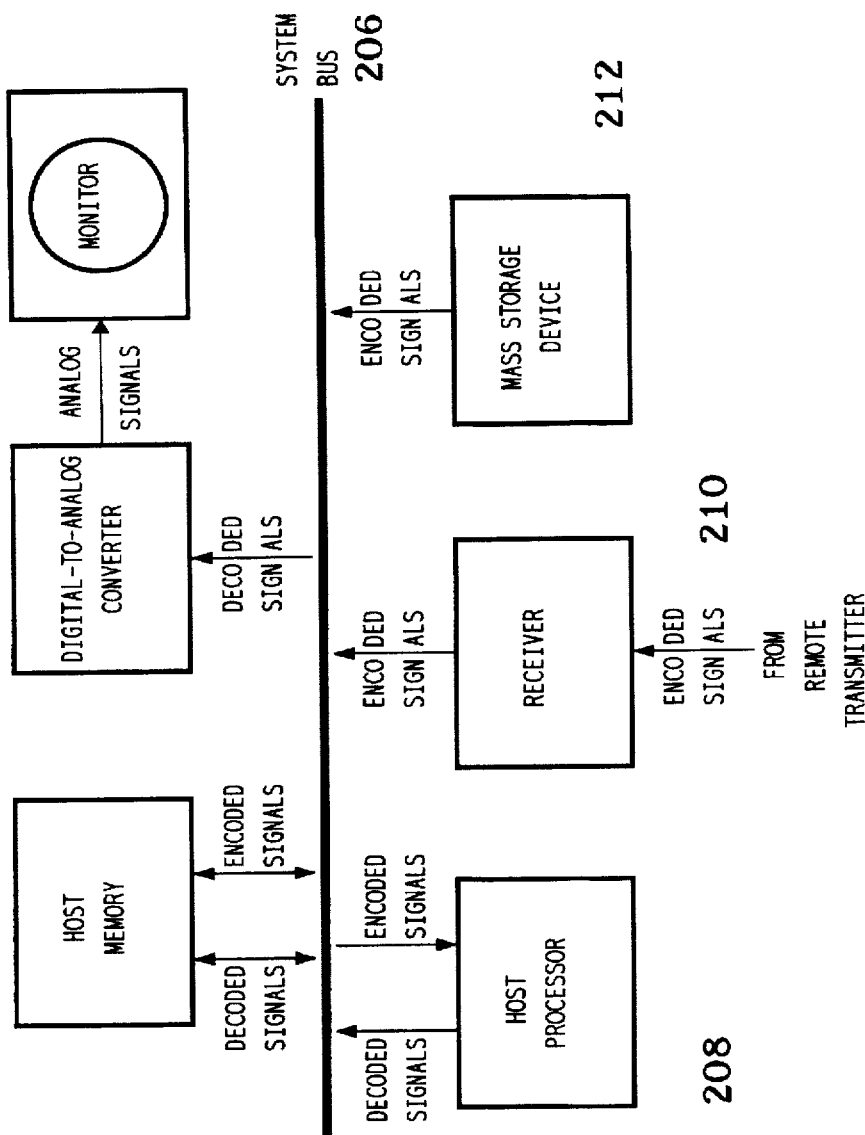
FIG. 2 is a computer-based decoding system for decoding the video signals encoded by the video processing system of FIG. 1, according to a preferred embodiment of the present invention.

Referring now to FIG. 2, there is shown a computer-based decoding system 200 for decoding the image signals encoded by encoding system 100 of FIG. 1, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 1. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 1, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled pictures. Pixel processor 106 may be any suitable means for encoding subsampled video image signals, where the means is capable of implementing a forward discrete cosine transform. Memory device 112 may be any suitable computer memory device and is preferably a video random access memory (VRAM) device. Bus 108 may be any suitable digital signal transfer device and is preferably an Industry Standard Architecture (ISA) bus or Extended ISA (EISA) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386™, 486™, or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC) -based display system such as a VGA or SVGA system. Monitor 204 may be any means for displaying analog image signals and is preferably a VGA monitor.

Referring now to FIG. 2, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 1 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encoded and decoded video image signals. Those skilled in the art will understand that such a combined system may be used to display decoded video image signals in real-time during the capture and encoding of video signals to monitor the encoding processing. In a preferred embodiment, encoding system 100 encodes video image signals in real time to yield an encoded bitstream, and transmits the encoded bitstream to decoding system 200. Encoding system 100 implements the present invention as described in further detail hereinbelow.

Encoder Rate Control

Figure 3:
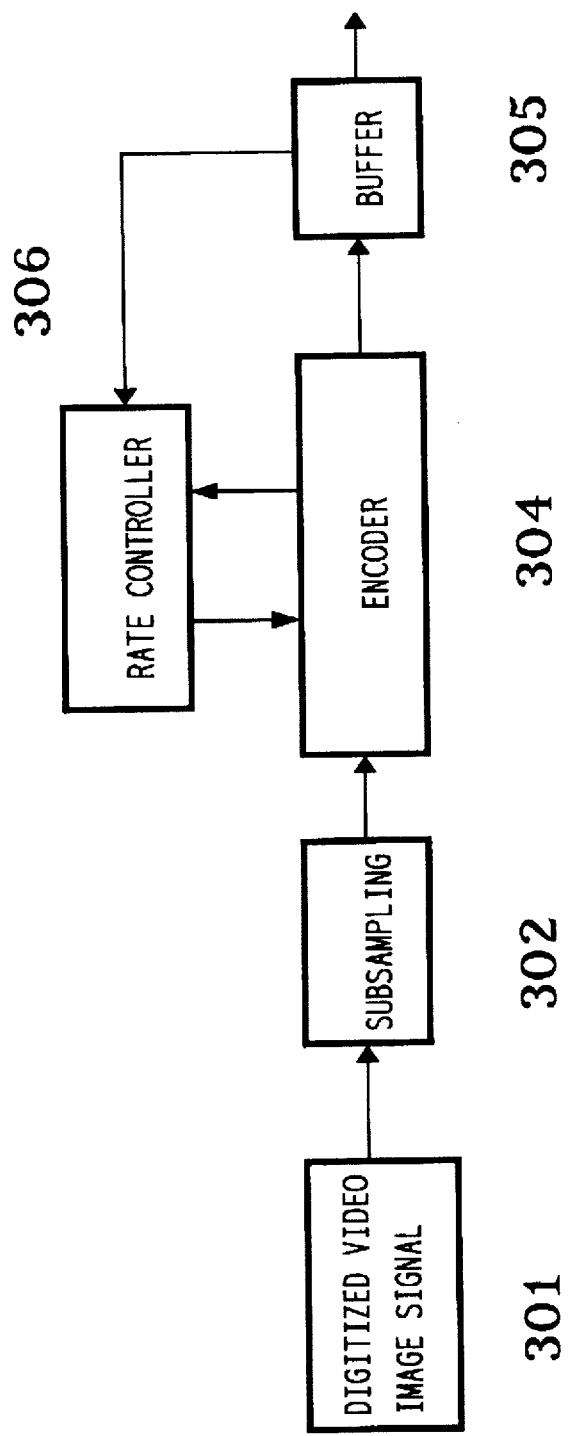
FIG. 3 is a process flow diagram of the encoding processing implemented by the video processing system of FIG. 1.

Referring now to FIG. 3, there is shown a process flow diagram of the encoding processing implemented by capture processor 104 and pixel processor 106 of FIG. 1, according to a preferred embodiment of the present invention. As shown in FIG. 3, capture processor 104 of FIG. 1 captures and digitizes video image signals to provide a digitized video image signal 301. As described above, video image signal 301 is a single picture of video data, which may be a still image or one of a plurality of pictures that constitute motion video. Capture processor 104 further performs the subsampling 302 of digitized image 301 to provide a subsampled, digitized video image comprising an array of pixels. At this point the pixel array is broken up into subimages or blocks of (8×8) pixels which are encoded further.

Encoder 304, also under control of rate controller 306, applies a transform such as a DCT to the subimage blocks and quantizes the DCT coefficients at a determined quantization level. Buffer 305 next receives the encoded bitstream representing the quantized DCT coefficients for transmission via the transmission medium to a destination source. It will be understood by those skilled in the art that, in a preferred embodiment, the functional elements of the process flow diagram of FIG. 3 are implemented by capture processor 104 and pixel processor 106 of FIG. 1. Those skilled in the art will further appreciate that additional processing may be applied to video image signal 301 at or after the encoder 304 stage, such as motion estimation, inter- or intra-picture encoding, and run-length encoding.

Macroblock Type Selection

Figure 4:
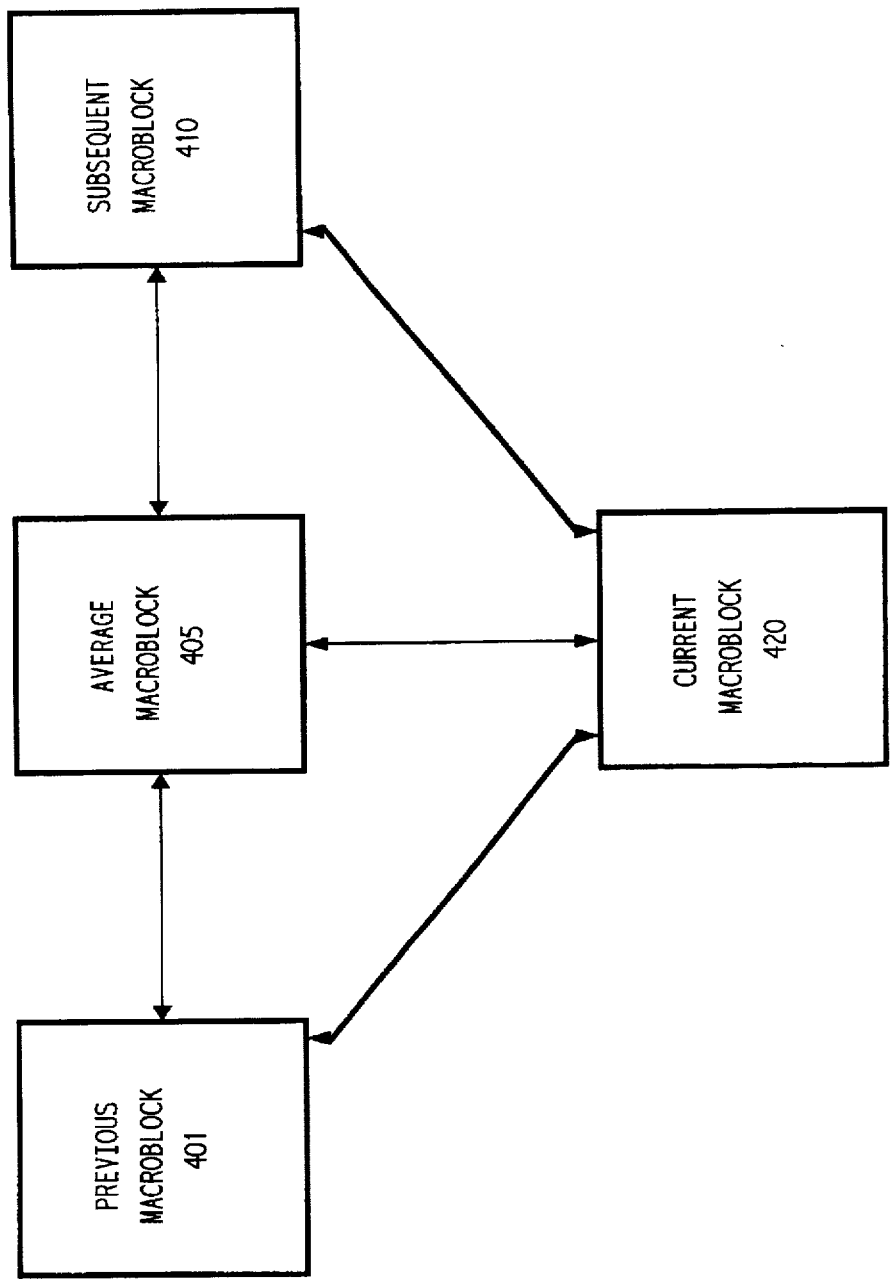
FIG. 4 depicts a current macroblock and candidate reference macroblocks, according to a preferred embodiment of the present invention.

Referring now to FIG. 4, there is depicted a current macroblock 420 and candidate reference macroblocks 401, 405, and 410, according to a preferred embodiment of the present invention. As illustrated, current macroblock 420, sometimes referred to as a target macroblock, is a B macroblock that is to be predicted, if possible and efficient, from either previous macroblock 401, subsequent macroblock 410, or average macroblock 405, depending upon which of these three reference macroblock types is selected. As will be understood, macroblocks 401, 405, 410 are reference macroblocks from which current macroblock may be reconstructed by a decoder by transmitting an appropriate motion vector and the macroblock type, along with any residual error information transmitted with the associated motion vector. Previous macroblock 401 and subsequent macroblock 410 may be macroblocks from the pictures immediately preceding and immediately following the current picture of which current macroblock 420 is a part. Each macroblock 401, 410 is associated with a motion vector corresponding to the spatial displacement within a standard picture between current macroblock 420 and the respective reference macroblock.

Average or interpolated macroblock 405 is a macroblock created by averaging or interpolating the pixels between previous and subsequent macroblock 401 and 410, as illustrated by the horizontal arrows interconnecting these macroblocks. Average macroblock 405 may be determined by an intermotion vector, where motion between the previous and next pictures is presumed to be uniform with time.

As will be understood, any or none of the three reference macroblocks 401, 405, 410, may be selected as the basis for interpolation for current macroblock 420, depending upon which one is associated with the smallest difference error, or in accordance with other criteria as described below. As will be understood, selecting previous macroblock 401 corresponds to forward prediction, selecting subsequent macroblock 410 corresponds to backward prediction, and selecting average macroblock 405 corresponds to interpolated prediction.

As will be understood, for each reference macroblock type that may be selected (previous, subsequent, or interpolated), encoder 304 (implemented by pixel processor 106) must make further decisions in the encoding process. First, encoder 304 must determine whether the given reference macroblock gives a good enough representation of the current macroblock to allow current macroblock 420 to be non-intracoded. If macroblock 420 is to be non-intracoded, i.e. prediction coded, encoder 304 must then decide whether the residual error can be ignored or needs to be further encoded. If the residual error is significant enough to warrent encoding it, encoder 304 decides whether to encode the residual error using the same quantization level previously determined or using a different quantization level. If the residual error is not to be coded, encoder 304 decides whether to encode macroblock 420 as a predicted block or as a skipped block, as will be appreciated by those skilled in the art. If macroblock 420 is to be intracoded, encoder 304 decides whether to intracode macroblock 420 using the same quantization level previously determined or using a different quantization level.

In the present invention, as described in further detail hereinbelow, after already having performed the forward and backward motion error analysis, it is assumed that the forward and backward residual errors are random and thus uncorrelated. After making this assumption, which is a substantially accurate assumption for many video processing applications, the interpolated error may be determined based on the forward and backward errors, as described in detail below.

In a preferred embodiment, the reference macroblock type is selected from either forward, backward, or interpolated macroblock types, in accordance with the error or cost associated with each type. A cost function provides a cost for each macroblock type, and this cost may be minimized by selecting the macroblock type having the lowest cost. The present invention provides a means and method for determining these costs. In a preferred embodiment, the cost may be associated with a mean square error (MSE) measurement between the current macroblock and the particular reference macroblock, which may be calculated, for example, with the L2 Norm. Alternatively, a mean absolute error (MAE) measurement may also be utilized to determine the cost of a given reference macroblock type, which may be calculated with the L1 Norm hereinabove described. The error may be determined based on the MSE or MAE of the luminance difference between the motion compensated reference macroblock and the current macroblock to be encoded. In the present invention the best, i.e. lowest, cost mode of these three types is determined, and then a decision is made whether to encode the block using this macroblock type, another type, or using intracoding.

Mean Square Error

Let the luma value of the pixels of previous macroblock 401 of the previous picture be represented by p, those of subsequent macroblock 410 of the next picture be n, and those pixels of current macroblock 420 of the current or target picture be t.

Forward motion estimation gives a total MSE $f^2$ as follows:

$$f^2 = \Sigma(p-t)^2$$

Similarly, backward motion estimation $b^2$ is:

$$b^2 = \Sigma(n-t)^2$$

the total MSE of the interpolated macroblock is then:

$$\begin{aligned}
e^2 &= \Sigma((p+n)/2 - t)^2 \\
&= 1/4\, \Sigma(p+n-2t)^2 \\
&= 1/4\, \Sigma(p-t+n-t)^2 \\
&= 1/4\, \Sigma((p-t)^2 + (n-t)^2 + 2(p-t)(n-t)) \\
&= 1/4\, f^2 + 1/4\, b^2
\end{aligned}$$

The last step is true provided that (p–t) and (n–t) are uncorrelated, and is a close approximation provided the correlation is small. In practice there is likely to be some correlation, however. Further, as will be understood, an additional source of error may arise because motion vectors are estimated from source images, whereas interpolation upon reconstruction of current macroblock 420 may be performed utilizing reconstructed images. An alternative formula for estimating e is $$e^2 = \frac{1}{K}\, (f^2 + b^2)$$

where K is less than 4 to allow for correlation.

Mean Absolute Error

Forward motion estimation gives a total MAE f as follows:

$$f = \Sigma|p-t|$$

Similarly, backward motion estimation b is:

$$b = \Sigma|n-t|$$

the total MAE of the interpolated macroblock is then:

$$\begin{aligned}
e &= \Sigma|(p+n)/2 - t| \\
&= 1/2\, \Sigma|p-t+n-t| \\
&= 1/2\, \sqrt{((\Sigma|p-t|)^2 + (\Sigma|p-t|)^2)} \\
&= 1/2\, \Sigma((p-t)^2 + (n-t)^2 + 2(p-t)(n-t)) \\
&= 1/2\, \sqrt{(f^2 + b^2)}
\end{aligned}$$

The last step is true provided that |p–t| and |n–t| are uncorrelated. In practice there is likely to be some correlation, however, as is the case with MSE. An alternative formula for estimating e is $$e = \frac{1}{K}\, \sqrt{(f^2 + b^2)}$$

where K is less than 2 to allow for correlation.

Thus, using either MSE or MAE, if the forward and backward error are relatively uncorrelated, then given the MAE or MSE for the forward and backward macroblocks the MAE or MSE for the interpolated macroblock 405 may be estimated. Therefore, the present invention provides a means and method for determining the interpolated error based on the backward and forward error, by exploiting the fact that the forward and backward error terms are often uncorrelated.

Selection of Macroblock Type

As will be understood, once the interpolated error or cost is estimated as described above, the macroblock type may be selected in several ways. In one embodiment, the macroblock type yielding the lowest error is selected.

In another preferred embodiment, for MSE error measurements, it has been determined by the inventor that good results are obtained by selecting the interpolated macroblock type if errors $f^2$ and $b^2$ are within a ratio of 3 of each other. For a safer margin of error and to better allow for correlation and other effects, a ratio closer to 2 may also be utilized.

For MAE type measurements, it has been determined by the inventor that good results are obtained by selecting the interpolated macroblock type if errors f and b are within a ratio of $\sqrt{3}$ of each other. Alternatively, a ratio of $\sqrt{2}$ or 1.5 may be utilized instead.

Flow Chart

Figure 5:
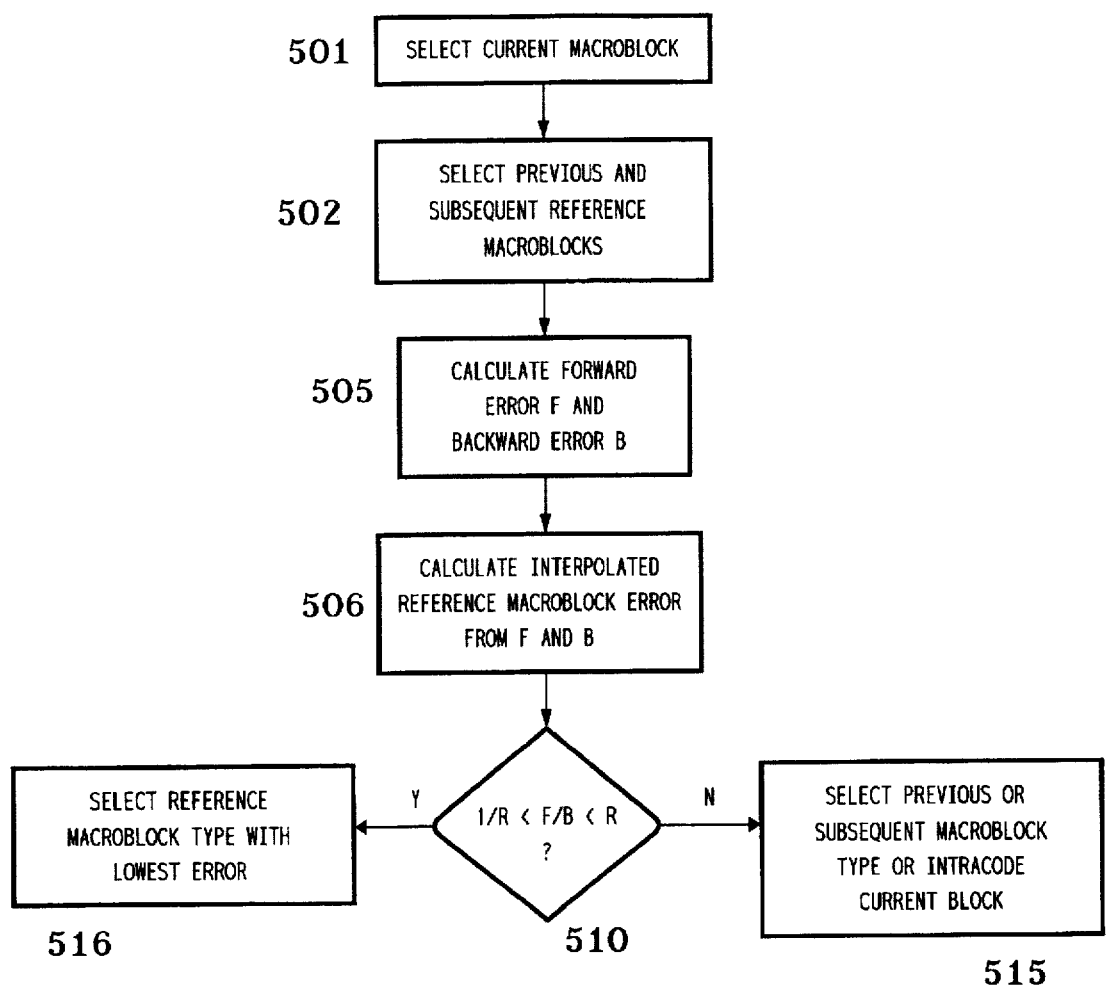
FIG. 5 is a flow chart of the method of operation of the video system of FIG. 1.

Referring now to FIG. 5, there is shown flow chart 500 of the method of operation of video system 100 of FIG. 1. As illustrated, current macroblock 420 is selected (step 501). Previous and subsequent macroblocks 401 and 410 are then determined (step 502). The forward error f and backward error b are then calculated, as described hereinabove (step 505). As will be understood, MSE rather than MAE may be calculated instead. Thereafter, the error associated with average reference macroblock 405 is calculated, as described above, solely from f and b (or from $f^2$ and $b^2$), with the simplifications described above based on the assumption of non-correlation between f and b (step 506). In one embodiment, if f and b are within a predetermined ratio R of each other (step 510), then the reference macroblock type having the lowest error is selected (step 516). Alternatively, as described above, the interpolated macroblock type 405 may be selected in this event. If no, however (step 510), another macroblock selection or encoding technique is chosen, because the ratio of f and b is high enough to indicate that the correlation between f and b is significant enough to materially affect the e estimate. Thus, in this case, for example, either the previous or subsequent macroblock type 501 or 510 may be selected, or current macroblock 520 intracoded (step 515).

As will be appreciated, although the above-described embodiments are described in the context of macroblocks, the present invention may also usefully be applied to error estimation and motion estimation encoding on a block basis or on a whole picture basis. Although the above-described embodiments utilize luma pixels for the MSE and MAE measurements, those skilled in the art will understand that other types of pixels, including RGB pixels or chrominance pixels, or combinations thereof, may be compared with one another in order to determine the residual error between a current target block and a reference block.

As will be understood by those skilled in the art, average reference macroblock 405 in the above-described embodiment is a macroblock interpolated between previous and subsequent macroblocks 401 and 410, by averaging motion-compensated pixels. However, in alternative preferred embodiments, more than one interpolated reference macroblock may be considered, which is interpolated at intervals between the previous and subsequent reference macroblocks at intervals other than halfway therebetween. In this case the above-described techniques of the present invention may be utilized after appropriate modification to estimate the interpolation error corresponding to such multiple or variable interpolated reference macroblocks.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A computer-implemented method for encoding a current block of pixels of a current picture of a sequence of pictures, the sequence of pictures comprising a previous picture having a previous reference block and a subsequent picture having a subsequent reference block, the method comprising the steps of:

(a) determining a previous residual error between the current block and the previous reference block;

(b) determining a subsequent residual error between the current block and the subsequent reference block;

(c) defining at least one interpolated picture interpolated between the previous and subsequent pictures, the interpolated picture having an interpolated reference block; and (d) determining, from the previous and subsequent residual errors, an interpolated residual error between the current block and the at least one interpolated reference block, wherein the interpolated residual error is for reproducing said current block from said interpolated reference block.

2. The method of claim 1, wherein the previous, subsequent, and interpolated residual errors are mean absolute errors.

3. The method of claim 2, wherein the mean absolute errors are determined with reference to differences between luminance pixels of the current block and luminance pixels of the respective reference blocks.

4. The method of claim 1, wherein the previous, subsequent, and interpolated residual errors are mean square errors.

5. The method of claim 4, wherein the mean square errors are determined with reference to differences between luminance pixels of the current block and luminance pixels of the respective reference blocks.

6. The method of claim 1, wherein:

step (a) comprises the step of calculating the previous residual error $f^2$ in accordance with the formula $f^2 = \Sigma (p-t)^2$, wherein t are luminance pixel values of the current block and p are luminance pixel values of the previous reference block; and step (b) comprises the step of calculating the subsequent residual error $b^2$ in accordance with the formula $b^2 = \Sigma [(n-t^2)](n-t)^2$, wherein n are luminance pixel values of the subsequent reference block.

7. The method of claim 6, wherein step (d) comprises the step of estimating the interpolated residual error $e^2$ in accordance with the formula $e^2 = \frac{1}{4}f^2 + \frac{1}{4}b^2$.

8. The method of claim 1, wherein:

step (a) comprises the step of calculating the previous residual error f in accordance with the formula $f = \Sigma |p-t|$, wherein t are luminance pixel values of the current block and p are luminance pixel values of the previous reference block; and step (b) comprises the step of calculating the subsequent residual error b in accordance with the formula $b=\Sigma|n-t|$, wherein n are luminance pixel values of the subsequent reference block.

9. The method of claim 8, wherein step (d) comprises the step of estimating the interpolated residual error e in accordance with the formula $e=\frac{1}{2}\sqrt{(f^2+b^2)}$.

10. The method of claim 1, further comprising the step of:
 (e) selecting one of the reference blocks in accordance with the residual errors for use in prediction-encoding the current block.

11. The method of claim 10, wherein step (e) comprises the step of selecting the reference block having the lowest residual error.

12. The method of claim 10, wherein step (e) comprises the step of selecting the interpolated reference block if the previous residual error and subsequent residual error are within a predetermined ratio of one another.

13. An apparatus for encoding a current block of pixels of a current picture of a sequence of pictures, the sequence of pictures comprises a previous picture having a previous reference block and a subsequent picture having a subsequent reference block, the apparatus comprises:
 (a) means for determining a previous residual error between the current block and the previous reference block;
 (b) means for determining a subsequent residual error between the current block and the subsequent reference block;
 (c) means for defining at least one interpolated picture interpolated between the previous and subsequent pictures, the interpolated picture having an interpolated reference block; and
 (d) means for determining, from the previous and subsequent residual errors, an interpolated residual error between the current block and the at least one interpolated reference block, wherein the interpolated residual error is for reproducing said current block from the said interpolated reference block.

14. The apparatus of claim 13, wherein the previous, subsequent, and interpolated residual errors are mean absolute errors.

15. The apparatus of claim 14, wherein the mean absolute errors are determined with reference to differences between luminance pixels of the current block and luminance pixels of the respective reference blocks.

16. The apparatus of claim 13, wherein the previous, subsequent, and interpolated residual errors are mean square errors.

17. The apparatus of claim 16, wherein the mean square errors are determined with reference to differences between luminance pixels of the current block and luminance pixels of the respective reference blocks.

18. The apparatus of claim 13, wherein:
 means (a) comprises means for calculating the previous residual error $f^2$ in accordance with the formula $f^2=\Sigma(p-t)^2$, wherein t are luminance pixel values of the current block and p are luminance pixel values of the previous reference block; and
 means (b) comprises means for calculating the subsequent residual error $b^2$ in accordance with the formula $b^2=\Sigma[(n-t^2)](n-t)^2$, wherein n are luminance pixel values of the subsequent reference block.

19. The apparatus of claim 18, wherein means (d) comprises means for estimating the interpolated residual error $e^2$ in accordance with the formula $e^2=\frac{1}{4}f^2+\frac{1}{4}b^2$.

20. The apparatus of claim 13, wherein:
 means (a) comprises means for calculating the previous residual error f in accordance with the formula $f=\Sigma|p-t|$, wherein t are luminance pixel values of the current block and p are luminance pixel values of the previous reference block; and
 means (b) comprises means for calculating the subsequent residual error b in accordance with the formula $b=\Sigma|n-t|$, wherein n are luminance pixel values of the subsequent reference block.

21. The apparatus of claim 20, wherein means (d) comprises means for estimating the interpolated residual error e in accordance with the formula $e=\frac{1}{2}\sqrt{(f^2+b^2)}$.

22. The apparatus of claim 13, further comprising:
 (e) means for selecting one of the reference blocks in accordance with the residual errors for use in prediction-encoding the current block.

23. The apparatus of claim 22, wherein means (e) comprises means for selecting the reference block having the lowest residual error.

24. The apparatus of claim 22, wherein means (e) comprises means for selecting the interpolated reference block if the previous residual error and subsequent residual error are within a predetermined ratio of one another.

25. The apparatus of claim 13, further comprising:
 (e) a bus; and
 (f) a memory device electrically connected to the bus.

26. A storage medium encoded with machine-readable computer program code for encoding a current block of pixels of a current picture of a sequence of pictures, the sequence of pictures comprising a previous picture having a previous reference block and a subsequent picture having a subsequent reference block, the storage medium comprising:
 (a) means for causing a computer to determine a previous residual error between the current block and the previous reference block;
 (b) means for causing the computer to determine a subsequent residual error between the current block and the subsequent reference block; and
 (c) means for causing the computer to determine, from the previous and subsequent residual errors, an interpolated residual error between the current block and an interpolated reference block of at least one interpolated picture interpolated between the previous and subsequent pictures, wherein the interpolated residual error is for reproducing said current block from said interpolated reference block.

27. The storage medium of claim 26, wherein the previous, subsequent, and interpolated residual errors are mean absolute errors.

28. The storage medium of claim 27, wherein the mean absolute errors are determined with reference to differences between luminance pixels of the current block and luminance pixels of the respective reference blocks.

29. The storage medium of claim 26, wherein the previous, subsequent, and interpolated residual errors are mean square errors.

30. The storage medium of claim 29, wherein the mean square errors are determined with reference to differences between luminance pixels of the current block and luminance pixels of the respective reference blocks.

31. The storage medium of claim 26, wherein:
 means (a) comprises means for causing the computer to calculate the previous residual error $f^2$ in accordance with the formula $f^2=\Sigma(p-t)^2$, wherein t are luminance pixel values of the current block and p are luminance pixel values of the previous reference block; and means (b) comprises means for causing the computer to calculate the subsequent residual error $b^2$ in accordance with the formula $b^2=\Sigma(n-t)^2$, wherein n are luminance pixel values of the subsequent reference block.

32. The storage medium of claim 31, wherein means (c) comprises means for causing the computer to estimate the interpolated residual error $e^2$ in accordance with the formula $e^2=\frac{1}{4}f^2+\frac{1}{4}b^2$.

33. The storage medium of claim 26, wherein:

means (a) comprises means for causing the computer to calculate the previous residual error f in accordance with the formula $f=\Sigma|p-t|$, wherein t are luminance pixel values of the current block and p are luminance pixel values of the previous reference block; and means (b) comprises means for causing the computer to calculate the subsequent residual error b in accordance with the formula $b=\Sigma|n-t|$, wherein n are luminance pixel values of the subsequent reference block.

34. The storage medium of claim 33, wherein means (c) comprises means for causing the computer to estimate the interpolated residual error e in accordance with the formula $e=\frac{1}{2}\surd(f^2+b^2)$.

35. The storage medium of claim 26, further comprising:

(d) means for causing the computer to select one of the reference blocks in accordance with the residual errors for use in prediction-encoding the current block.

36. The storage medium of claim 35, wherein means (d) comprises means for causing the computer to select the reference block having the lowest residual error.

37. The storage medium of claim 35, wherein means (d) comprises means for causing the computer to select the interpolated reference block if the previous residual error and subsequent residual error are within a predetermined ratio of one another.

* * * * *

UNITED STATES PATENT AND TRADEMARK OFFICE
CERTIFICATE OF CORRECTION

PATENT NO. : 5,703,966
DATED : December 30, 1997
INVENTOR(S) : Brian Astle

It is certified that error appears in the above-identified patent and that said Letters Patent is hereby corrected as shown below:

Column 12, line 59, delete "$b^2 = \sum [(n-t^{2)}](n-t)^2$" and insert therefor --$b^2 = \sum (n-t)^2$--;

Column 13, line 39, delete "the" after the words "block from";

Column 13, lines 62 and 63, delete "$b^2 = \sum [(n-t^{2)}](n-t)^2$" and insert therefor --$b^2 = \sum (n-t)^2$--.

Signed and Sealed this

Twenty-second Day of June, 1999

Q. TODD DICKINSON

*Attest:*

*Attesting Officer*    Acting Commissioner of Patents and Trademarks